Patented June 2, 1953

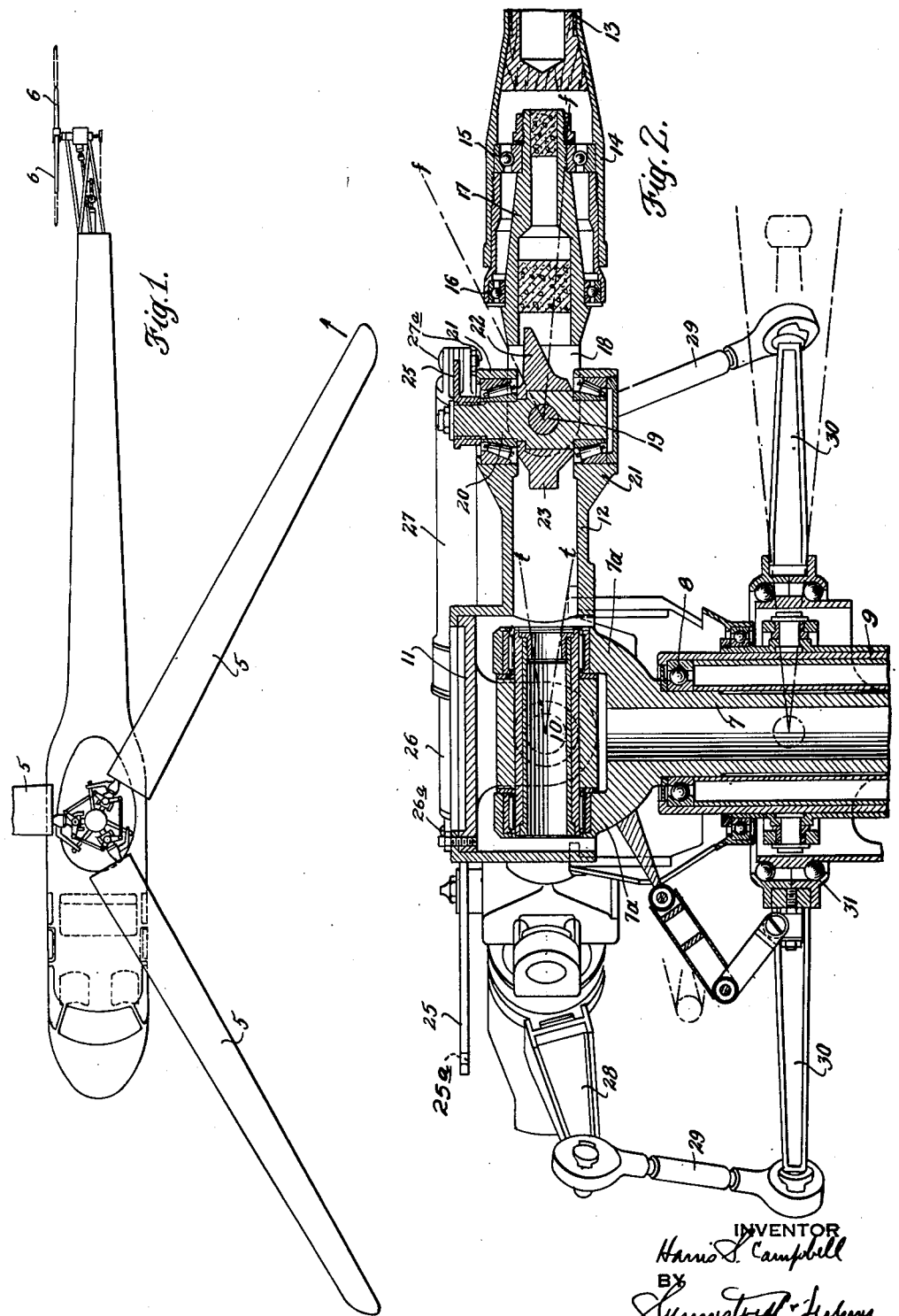

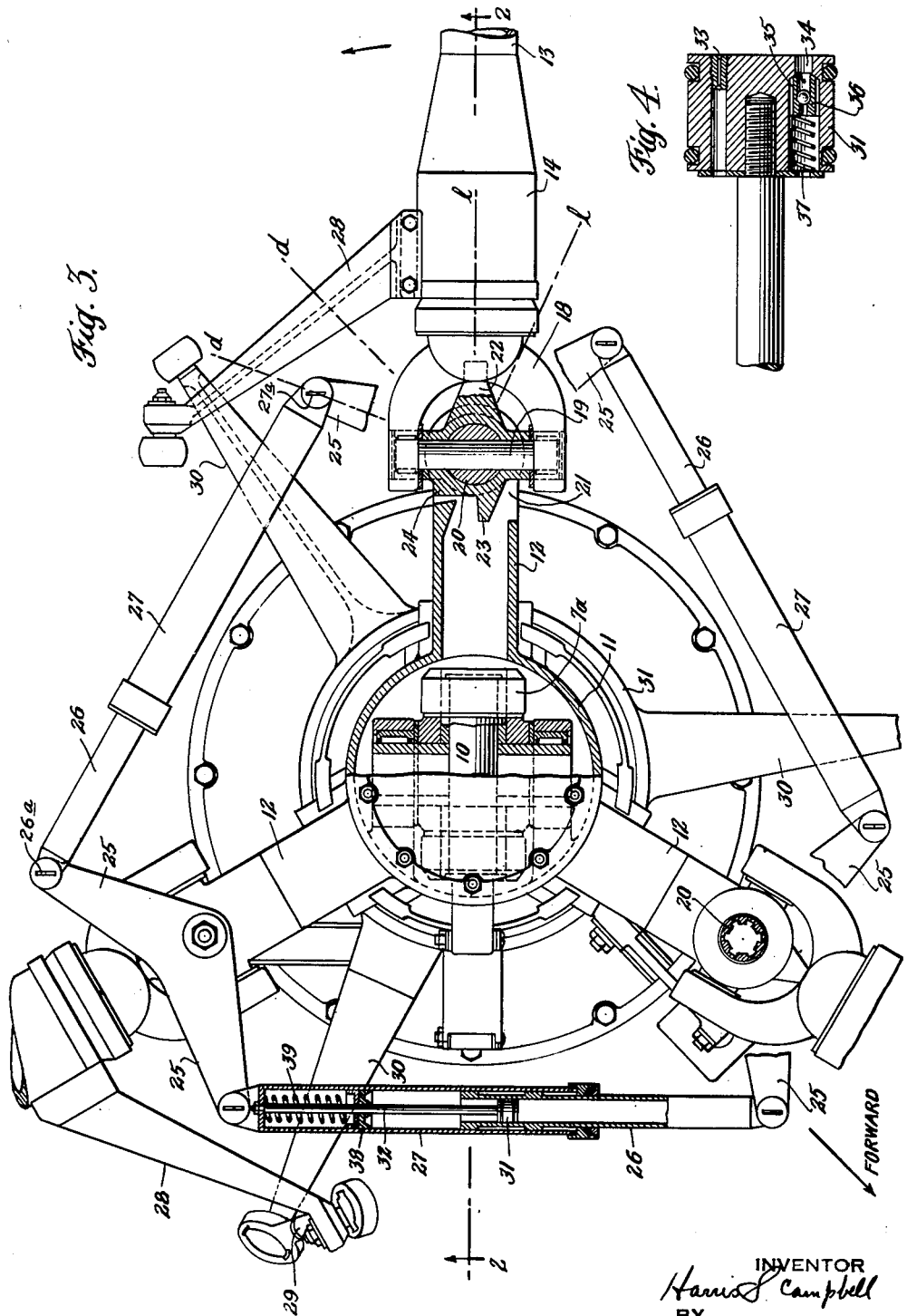

2,640,554

UNITED STATES PATENT OFFICE 2,640,554

MECHANISM FOR CONTROLLING BLADE MOVEMENTS OF AIRCRAFT SUSTAINING ROTORS

Harris S. Campbell, Bryn Athyn, Pa., assignor to Autogiro Company of America, Philadelphia, Pa., a corporation of Delaware Application October 10, 1946, Serial No. 702,524

5 Claims. (Cl. 170—160.55)

This invention relates to a mechanism for controlling the movements of pivoted blades of aircraft sustaining rotors. The present application is a continuation in part of my copending application Serial No. 605,577, filed July 17, 1945, now issued as Patent No. 2,580,514 on January 1, 1952.

Although various features of the invention are applicable to rotative winged aircraft of a variety of types, the invention is especially concerned with that type of rotative winged aircraft incorporating a sustaining rotor adapted alternatively to be power driven or to be autorotationally actuated. The invention is especially concerned with a novel blade movement control mechanism effective to control lag-lead displacements of the blades about "drag" pivot axes.

One of the principal objects of the invention is the provision of a mechanism for controlling differential lag-head displacements as between blades, the mechanism being substantially ineffective with reference to conjoint lagging or leading displacements of all blades in the same sense.

According to another aspect of the invention, the rotor blades are mounted not only on drag pivots but also on flapping pivots, the axes of these two pivots for each blade substantially intersecting each other, but the drag pivots being operatively interposed between the rotor hub and the flapping pivots for the respective blades. In the arrangement of the invention the blade movement control mechanism is connected with blade mounting parts which are movable with the blade in the lag-lead sense, with the result that flapping movements are not communicated to the blade movement control mechanism. Because of this configuration of pivots and of the damper mechanism, the latter need not incorporate flexible joints or the like which would otherwise be required to accommodate individual flapping movements of the blades.

A still further object of the invention is the provision of a novel form of blade damper.

How the foregoing and other objects and advantages are attained will appear more fully from the following description referring to the accompanying drawings, in which—

Figure 1 is a plan outline view of a single rotor helicopter incorporating the mechanism of the present invention, one of the three blades of the sustaining rotor being broken off;

Figure 2 is a vertical sectional view, to an enlarged scale, of the rotor head and certain associated parts, this view being taken as indicated by the section line 2—2 on Figure 3;

Figure 3 is a plan view, partly in elevation and partly in horizontal section, of the rotor head shown in Figure 2; and Figure 4 is a sectional view of a portion of one of the blade movement control devices.

In considering the drawings attention is first directed to Figure 1 in which the invention is shown as applied to a helicopter type aircraft having a single generally centralized sustaining rotor incorporating three sustaining rotor blades 5 and also having a torque counteracting tail rotor incorporating a pair of blades 6. The rotor and the airscrew are both adapted to be driven by an engine (not shown), and the power transmission is preferably arranged to provide not only for power drive of the rotor and airscrew but also for autorotational actuation of the rotor, for instance in the event of engine failure. These parts need not be described in detail herein since they form no part of the present invention per se. It is noted, however, that they are more fully illustrated and described in my copending application above referred to. It is here further noted that, as disclosed in said copending application, the power transmission desirably includes an overrunning clutch providing for free autorotational actuation of the rotor in the event of engine failure, which clutch is so located in the power transmission that, in the event of engine failure, the torque counteracting airscrew will be driven by the sustaining rotor and therefore will continue its rotation.

Referring now to Figures 2 and 3, the rotor drive spindle 7 which serves also to support the rotor is mounted by means of bearings, one of which appears at 8, within a non-rotative supporting sleeve 9 which is adapted to be mounted in the body of the aircraft. At its upper end the spindle 7 is forked as at 7a—7a, the forks being apertured to cooperate with a universal joint 10 by means of which the rotor hub member 11 is mounted for tilting movement.

In the illustrated embodiment, with three blades, the hub member 11 is provided with three projecting blade mounting stubs 12 equally spaced angularly about the hub. Each blade is connected with one of the stubs 12 by means of individual pivots which are now described with reference to the blade at the right-hand side of Figures 2 and 3. The root end 13 of the blade is enlarged inwardly to form the external part 14 of a pitch mounting. This part is mounted by bearings 15 and 16 on a spindle 17, the axis of the bearings 15 and 16 being substantially coincident with the longitudinal axis of the blade or its spar. The blade is thus mounted with freedom for pitch change movement, i. e., pivot connections providing for relative angling in one plane but not necessarily any universal motion. Such connections (as seen in Figs. 2 and 3) may comprise apertures 25a, in said levers 25, pin-connected with the dampers as by pivot pins 26a and 27a. The spindle 17 is provided with fork prongs 18—18, these prongs being apertured to receive the flapping pivot pin 19, which pin projects transversely through the drag pivot pin 20 which is journaled in apertured ears 21—21 formed at the outer end of the blade mounting stub 12. The intersecting flapping and drag pivots provide freedom for swinging movement of the blade in the flapping sense (as indicated by the lines f—f in Figure 2) and also freedom for lag-lead movement (as indicated by lines l—l in Figure 3). Limiting stops for these blade movements are associated with the intersecting pivots and include a stop member 22 projecting into the interior of the spindle 17 and serving to define the range of flapping movement f—f. Stop 23 (see particularly Figure 3) projects radially inwardly toward the hub within the hollow stub 12 and serves to define the limit of lag-lead motion in the lagging sense. Stop 24 limits swinging of the blade on the drag pivot in the leading sense, the stops 23 and 24 being arranged to define the range of lag-lead movement.

It will be understood that the blade swinging movements described just above take place with reference to the hub member and thus that the flapping and lag-lead movements are movements in addition to the freedom of motion provided by virtue of the universal or tilting mounting of the hub member. In Figure 2 a typical range of tilting movement of the hub is indicated by the lines t—t.

As seen in Figures 2 and 3, a double-ended lever 25—25 is mounted on and splined to each of the drag pivot pins 20. Adjacent arms 25 of adjacent blades are linked together by means of a blade movement control device advantageously in the form of a pair of relatively telescoping elements 26—27. Resistance to relative movement of the elements 26 and 27 is provided by hydraulic means described below.

In considering the blade damper arrangement it should be noted that the direct interconnection of the actuating arms 25 around the hub provides for damping lag-lead movements of the blades with relation to each other, without, however, appreciably resisting conjoint lag or lead movement of all blades in the same sense to the same degree. Moreover, since the drag pivots for the blades are operatively interposed between the flapping pivots and the hub, and since the dampers operate through levers 25 connected with the drag pivots, flapping motions of the blades are not communicated to the damper system, and simple pivot connections are all that is needed between the dampers and the levers 25.

Pitch control mechanism is also incorporated in the hub, including pitch control arms 28 projecting from the root ends of the blades, these arms being coupled by means of links 29 to arms 30 which radiate from the rotatable swash member 31. This pitch control mechanism need not be considered in detail herein since it forms no part of the present invention per se and is fully described in my copending applications above identified.

Turning now to the construction of the blade dampers 26—27, as shown at the left hand side of Figure 3, the parts 26 and 27 constitute piston and cylinder elements adapted to contain a hydraulic damping liquid, for instance oil. A piston 31 (shown in detail in Figure 4) is arranged for relative movement in member 26. This piston 31 is connected by means of a rod 32 with the base end of the external damper member 27. Therefore, as member 26 telescopes into member 27, the piston 31 enters farther into the interior of member 26. This motion of piston 31 into member 26 is resisted or retarded by virtue of the provision of only a small port through the piston, i. e., the port provided at 33 (see Figure 4). The piston 31 also has another passage extended therethrough as indicated at 34, and this passage is provided with a ball or similar check valve 35 which is held to its seat by the damping liquid when the piston 31 moves into the member 26. However, provision is made for relief of pressure ahead of piston 31 in the event of a sudden and excessive force tending to move the piston into the member 26. This is accomplished by arranging the ball valve 35 in a movable valve member 36 which is normally retained against its seat by a spring 37. Upon displacement of the member 36 (to the left when viewed as in Figure 4) the cross sectional flow area through the piston is increased, thereby avoiding the build-up of an excessive pressure within member 26.

Motion of piston 31 out of member 26 is not subject to appreciable hydraulic resistance, since motion in this direction will result in opening of the ball valve 35.

As seen in Figure 3, a piston 38 is arranged within the damper member 27, being spring pressed by means of spring 39, this piston 38 serving to maintain a slight pressure on the damper fluid to ensure that the pressure chamber will always be filled. This spring loaded piston further allows the volume of the chamber in member 27 to vary according to the extent to which the member 26 is telescoped within member 27, the variable volume being necessary because of the difference in cross sectional area of the cavities in the two members 26 and 27.

With dampers arranged as described above, each individual damper is effective to resist blade displacements only when a force is transmitted to the damper tending to telescope member 26 into the member 27. With the dampers arranged between and connected with adjacent blades all the way around the hub, the damping action provided is effective to restrain any lag-lead movements causing the blades to assume "out-of-pattern" positions. On the other hand, where all blades swing either forwardly or rearwardly in the same direction and to the same extent, no appreciably damping action is provided. In this way variations in the mean angle of lag of the blades (caused, for example, by a variation in the torque applied to the rotor drive spindle) are not appreciably resisted by the dampers.

It is also of importance in the arrangement above described that the dampers are connected with the drag pivots and that the flapping pivots are operatively interposed between the drag pivots and the blades. Because of this, flapping motions of the blades are not communicated to the damper system and therefore no flexible joints or mechanism need be incorporated to accommodate blade flapping movements.

I claim:
1. For an aircraft sustaining rotor having a hub and a plurality of blades each being connected with said hub through a drag pivot positioned with its axis extended generally transverse the mean plane of blade rotation, mechanism for controlling lag-lead blade movements comprising an operating arm fixed to each blade to move therewith in the lag-lead sense, and damper devices for controlling lag-lead movement of one blade with respect to another, said damper devices comprising pairs of relatively reciprocable members and means for resisting relative movement of said members, one of said members of each pair being connected with the operating arm of one blade and the other member of said pair being connected with the operating arm of another blade, the connection with the arms comprising pivots, and the two members of such pair being arranged for reciprocating movement on an axis extended between arms and acting to impose restraint on relative lag-lead blade displacements.

2. A multibladed aircraft sustaining rotor incorporating a rotative axis member, pivot mechanism mounting the blades on the axis member including flapping pivot means providing for differential lift compensation, the pivot mechanism further including drag pivots providing for lag-lead movements of one blade with respect to another, and interconnections between the blades, the flapping pivot means, the drag pivots and the axis member providing for differential lift compensation without altering the angular relation between the drag pivot axes, each blade having an operating arm connected with the blade to move therewith in the lag-lead sense, and damper devices for controlling the lag-lead movement of one blade with respect to another, said damper devices comprising pairs of relatively reciprocable members and means for resisting relative movement of said members, one of said members of each pair being connected with the operating arm of one blade and the other member of said pair being connected with the operating arm of another blade, the connections with the arms being simple pivots, and the two members of such pair being arranged for reciprocating movement on an axis extended between arms and acting to impose restraint on relative lag-lead blade displacements.

3. For an aircraft sustaining rotor having a hub and a plurality of blades each provided with a flapping pivot, a drag pivot for each blade operatively interposed between the flapping pivot and the rotor hub, and arranged to oscillate with the blades during lag-lead movement thereof, and mechanism for controlling lag-lead blade movements comprising arms connected with the drag pivots to move therewith, and damper devices connected with and extended between arms of adjacent blades around the hub.

4. A construction in accordance with claim 3 in which each damper device comprises a pair of fluid pressure piston and cylinder devices, one of which is connected with the arm extended from the drag pivot of one blade and the other of which is connected with the arm extended from the drag pivot of an adjacent blade.

5. A construction in accordance with claim 3 in which each damper device comprises a pair of fluid pressure piston and cylinder elements arranged to resist relative movement in one direction but to permit relatively free movement in the opposite direction.

HARRIS S. CAMPBELL.

References Cited in the file of this patent

UNITED STATES PATENTS

| Number | Name | Date |
|---|---|---|
| 1,859,584 | Cierva | May 24, 1932 |
| 1,884,905 | Stanley | Oct. 25, 1932 |
| 1,899,096 | Larsen | Feb. 28, 1933 |
| 1,905,776 | Wilford | April 25, 1933 |
| 1,948,457 | Larsen | Feb. 20, 1934 |
| 1,971,016 | Pecker | Aug. 21, 1934 |
| 1,971,043 | Larsen | Aug. 21, 1934 |
| 2,217,106 | Focke | Oct. 8, 1940 |
| 2,250,826 | Everts | July 29, 1941 |
| 2,465,681 | Gluhareff | Mar. 29, 1949 |